Patented Aug. 14, 1951

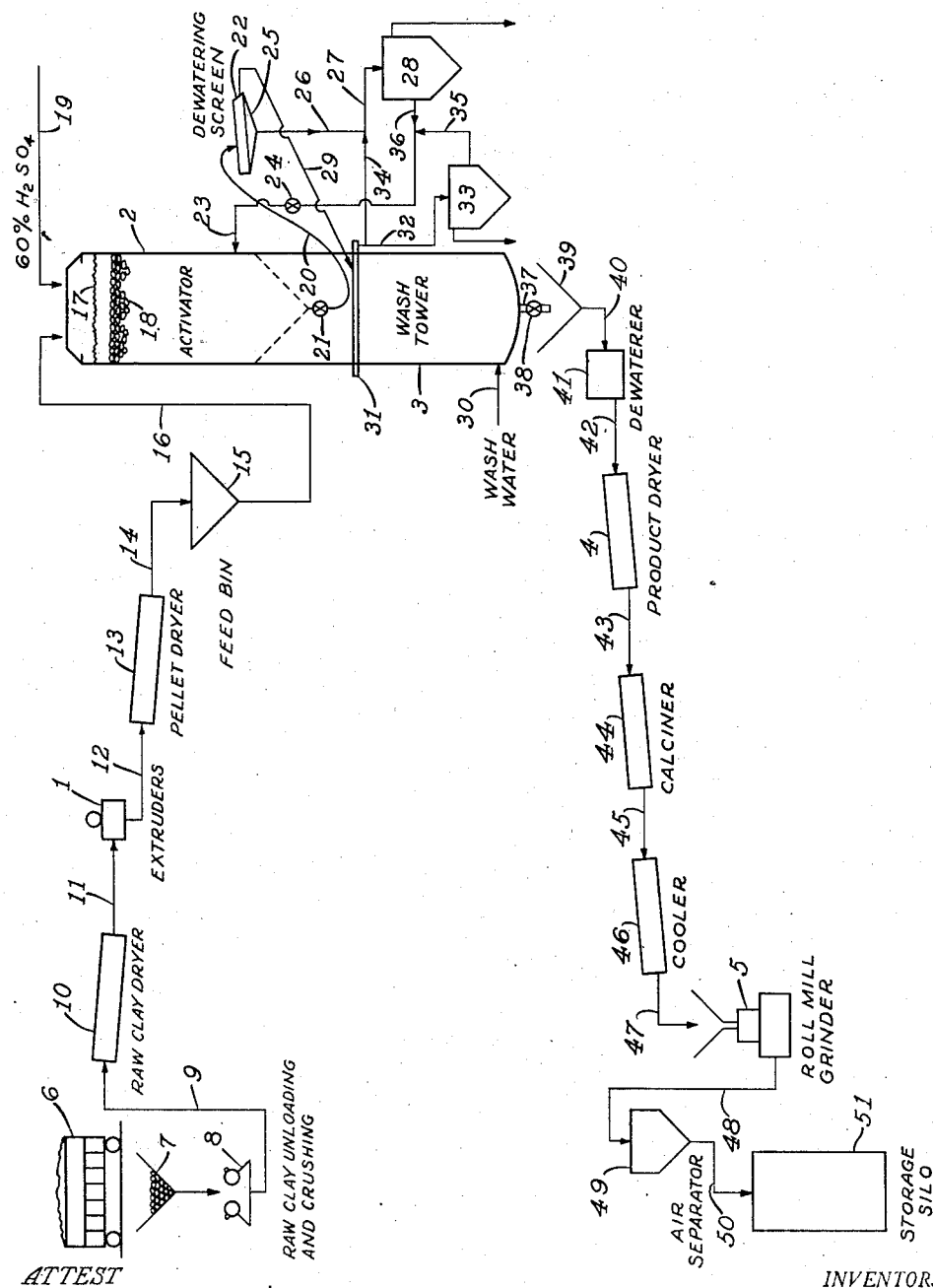

2,563,977

UNITED STATES PATENT OFFICE 2,563,977

PROCESS FOR CONTINUOUSLY ACID ACTIVATING CLAY

Lee Van Horn, Los Angeles, and Leon Arthur Kahn, Alhambra, Calif., assignors to Filtrol Corporation, Los Angeles, Calif., a corporation of Delaware Application December 8, 1949, Serial No. 131,883

6 Claims. (Cl. 252—450)

This invention relates to a process for the acid activation of clay to produce efficient bleaching earths and active catalytic materials. More particularly the invention relates to a continuous process for acid activating sub-bentonite clay pellets with an amount of concentrated acid solution which is insufficient of itself to submerge the clay.

It is well known that certain natural clays, particularly the sub-bentonites, can be treated with mineral acids, particularly sulfuric acid, to produce bleaching earths and active catalytic materials. It has been the practice to acid-treat such clays in their natural condition or after a rough crushing step. Such procedures are unsatisfactory in that a large amount of very fine material unavoidably present in the natural clay or formed during the activation, particularly in the range of 0 to 20 microns, is present in the product or is lost to the process in steps subsequent to the activation step. A more recent improvement in the art is that found in United States Patent No. 2,470,872, issued May 24, 1949, in which the patentee, Secor, discloses and claims a process for acid treating clay in which the clay is first formed into pellets by compression or extrusion before it is treated with acid. The compaction produced by the pelleting step eliminates or greatly reduces the content of very fine material, particularly in the range 0–20 microns, in the final product and the loss of such fine material in the process.

The instant invention is concerned with a process for acid activating clay pellets by submerging them in a solution of a mineral acid such as sulfuric acid of sufficient concentration to prevent excessive slaking and spalling of the pellets while using a quantity of acid which at the desired concentration is of itself insufficient to submerge the clay but which nevertheless is sufficient to cause the desired degree of activation of such clay. This is accomplished in a continuous process by introducing a continuous stream of pellets into a single unobstructed reaction zone together with a stream of acid of a sufficient concentration to prevent excessive slaking or spalling of the clay but in an amount which by itself is insufficient to cover the clay. A side stream of liquid is introduced into the lower portion of the reaction zone at a rate sufficient to maintain the level of acid above the level of the clay in the reaction zone without substantial dilution of the acid above the point of introduction of the last mentioned stream. The acid activated clay and spent acid are then removed from the bottom of the reaction zone. By conducting the process in this manner the movement of the acid through the reaction zone is retarded without impeding the motion of the clay. The activated clay is removed from the reaction zone at the rate at which it is introduced while the overall rate of liquid removal from the reaction zone is equivalent to the sum of the rates of introduction of all liquid to it but greater than the rate of addition of the concentrated acid solution.

As indicated, in such a process, it is desirable that undue slaking and spalling of the pellets in the reactor be avoided. This phenomenon occurs when the pellets are initially contacted with an acid of an overall concentration below about 25%. Concentrations below this amount, therefore, should be avoided in the initial phases of the activation. Higher concentrations may be used, but for most decolorizing products and cracking catalysts best results are obtained if the initial overall concentration of the acid is below about 45%. One of the principal advantages of the invention is that pellets can be treated in the same reaction zone with acid of sufficient concentration to prevent undue slaking and spalling after which the rest of the activation may be conducted at lower concentrations of acid.

Another important advantage of the invention is that the minimum amount of acid may be used to effect any desired degree of activation. Ideally, all the acid applied to the clay should be consumed by it. However, in order to accomplish such a result, too long a reaction time would be required for any commercial process. Practically, therefore, some unreacted acid is removed from the reaction zone in order to reduce the time required for the desired degree of activation of the clay. In any event, for any desired degree of activation to be accomplished in a desired time, the process of the invention affords a minimum waste of unused acid. For practical considerations, it is desirable to use in the process acid dosages (that is, pounds of acid calculated on a 100% acid basis per 100 pounds of volatile free clay) of from 30 to 65 pounds of acid per 100 pounds of volatile free clay and a reaction time of from 1½ to 7 hours. Clay having a hydrated silica content of from 10 to 50% or higher may be produced by control of these conditions. The hydrated silica content is determined by boiling the clay in a 2% solution of sodium carbonate and weighing the residue.

Still another advantage of the invention is to be found in controlling the temperature of the liquid introduced into the lower portion of the reaction zone so as to control the temperature of the discharge from that zone. In this way, corrosion of subsequent equipment which is exposed to the discharged liquid may be reduced. A further important advantage is to be found in the mechanical assistance for the discharge of the clay afforded by the introduction of this liquid, especially since there is a tendency for the acid activated clay to fail to flow freely and to arch above the discharge point.

Any suitable liquid may be used in the side stream to the reaction zone, such as water, mother liquor from the reaction or effluent from the subsequent washing of the activated clay. In general, however, it is desirable to use a liquid having a density as close as possible to that of the mother liquor resulting from the activation. Under these conditions there is less tendency for channelling and mixing of the introduced liquid with the acid in the reaction zone above the point of introduction of the liquid. It is also desirable in many instances to reduce the water consumption in the process. For these reasons it is desirable to use as the side stream the mother liquor either as such or in diluted form. This may be accomplished by recycling either the mother liquor undiluted or this liquor as it is diluted by subsequent washing.

In carrying out the process it is advantageous that the clay move through the reaction zone with a minimum amount of agitation. For this reason, boiling of the acid solution during the reaction with the clay should be avoided since it causes unwanted agitation with a tendency for excessive break-down of the pellets. Such boiling may be avoided by controlling the temperature of the incoming pellets and acid solution. Boiling may also be controlled to some extent by the temperature of the side stream or by circulating a heat-exchange medium through a suitable jacket surrounding the outside of the reaction zone.

The invention will be further illustrated in the following example and the accompanying drawing, the single figure of which shows a flow diagram of a process for acid activating clay pellets in which the invention is used. It should be understood, however, that the drawing and the examples are given primarily for illustration purposes and the invention in its broader aspects is not limited thereto.

In the drawing is shown in general a combination of extruders 1, acid activator 2 superimposed upon the washing tower 3, product drier 4, and roller grinder 5 for grinding the acid activated product to the desired size.

Raw clay from the mines is unloaded from car 6 into hopper 7 from which it drops into raw clay crusher 8 where the clay is crushed to a size which will permit it to pass through a 4-mesh screen. The crushed clay is then passed by means of conveyer 9 to raw clay drier 10 where its moisture content is reduced sufficiently to permit extrusion, after which it is passed to extruder 1 through conveyer 11. The volatile matter content of the clay during the extrusion is desirably in the range 33–37%. Since the raw clay usually exceeds this value it should be dried before it is extruded. Where, however, the volatile matter content is within this range the drying in drier 10 may be avoided or in the event the raw clay has a moisture content below this range sufficient water may be added to bring it within the desired range. After extruding, the pellets are passed in conveyer 12 to pellet drier 13 where their volatile matter content is further reduced after which they are passed through conveyer 14 into feed bin 15.

The pellet drier 13 reduces the moisture content of the pellets to a relatively uniform value. In addition to this, by removing additional moisture a lower concentration of acid may be introduced into the activator to obtain the desired overall concentration of the acid during the initial activation, taking into consideration the moisture in the pellets. In general, it is not desirable to reduce the moisture content of the pellets in pellet drier 13 below about 30–33%. The uniformly dried pellets in feed bin 15 may be cooled or heated therein to a suitable temperature before introduction into activator 2. Where extensive cooling or heating of the pellets is desired in order to control the temperature prevailing in the reaction zone, this may be accomplished by drawing air through the pellets in the feed bin. The cooling or heating may also be accomplished in the conduit from the bin to the top of the tower.

Pellets having a uniform moisture content and of a suitable temperature are transferred by conveyer 16 from the feed bin and introduced at a desired rate into the top of the activator 2 which contains a liquid maintained at level 17 which is above pellet level 18. The stream of concentrated sulfuric acid 19 is also introduced into the top of the activator. The concentration of this stream of acid is such that the overall concentration of acid in the top of the reactor in which the pellets are submerged is of such a value as to prevent undue breakdown of the pellets. The overall concentration of the acid is defined as the resultant concentration of the acid stream taking into consideration the water in the pellets. It is, therefore, the weight of 100% acid divided by the total liquid weight, including the weight of the water in the pellets, and multiplying the quotient by 100. The rate of introduction of the concentrated acid is such that the desired degree of activation of the clay is accomplished during the residence of the clay in the reactor but insufficient in volume by itself to maintain a level of liquid in the reactor above that of the clay.

The pellets move downwardly through the reaction zone at a rate dependent upon the rate of clay removal from that zone, which rate is controlled to give a desired residence time in this zone. Such time should be long enough so that the residence time of the pellets in the strong acid in the top of the reactor will harden them sufficiently and such that the overall time of contact of acid and clay in the reactor is sufficient to obtain the desired degree of activation. The clay together with the mother liquor is removed from the reaction zone through conduit 20, provided with valve 21, and is delivered to vibrating screen 22. One or more of such valved conduits similar to conduit 20 may be used. The hydrostatic pressure in activator 2 causes the clay and the mother liquor to pass through the conduit onto the vibrating screen.

Sufficient liquid is introduced as a side stream through inlet pipe 23, which is provided with control valve 24, to maintain a constant level 17 of liquid in the reactor above the level 18 of clay therein. The valve 24 may be controlled manually or by conventional constant level control mechanism not shown, such as a float in the top of the reactor connected to and adapted to actuate this valve. The liquid introduced at 23 passes out of the reactor almost immediately through outlet conduit 20. In so doing it retards the motion of the activating acid in its downward path through the reactor and thereby affords a means to maintain the highest concentration of acid in the top and upper portion of the reactor. This is accomplished with substantially no mixing between the introduced liquid and the concentrated acid. This is due largely to the presence of the clay solids, one particle resting upon the other in what may be thought of as a column of clay solids which moves downwardly through the reactor. The concentration of the acid, however, is continuously reduced as it proceeds through the reaction zone, due almost entirely to the consumption of the acid by the clay. Instead of introducing the side stream at a point adjacent to the bottom of the reactor as shown it may be introduced at one or a plurality of points in the lower half of the reaction zone; for best results, however, the stream or streams should be introduced in the lower fourth of the tower.

On the vibrating screen 22 the clay is separated from the mother liquor, the mother liquor falling into hopper 25 from which it passes through pipes 26 and 27 to tank 28. The clay passes off the high side of the vibrating screen 22 and falls into conduit 29 through which it slides into the wash tower 3, entering this tower at the top. If desired, the clay, while on the screen, may be partially washed with a spray of water. In the wash tower 3 the clay is washed countercurrently by a stream of water introduced into the tower at inlet 30, the water passing upwardly through the washing tower while the clay passes downwardly through it. The wash water flows over the edge of the washing tower into trough or launder 31 which surrounds the tower at this point. The wash water flows from launder 31 through pipe 32 into accumulator tank 33. Instead of passing the wash liquor into accumulator tank 33 it may be passed into the mother liquor tank 28 by means of conduit 34. Likewise, instead of countercurrent wash, the clay and wash water may pass concurrently through this tower.

Depending upon the desired density of the side stream 23 the mother liquor from the tank 28 may be used or this liquor may be used as diluted by the wash liquor from the wash tower which may be passed into tank 28 through pipes 34 and 27. In addition, the wash liquor as such may be used or this liquor blended with the mother liquor from the tank 28. Thus, the wash water from the tank 33 may be passed through pipe 35 into pipe 23 or the mother liquor as diluted with wash water may be passed from tank 28 through line 36 into pipe 23. Likewise, mother liquor as such or diluted and wash liquor from the tank 33 may both be led at desired rates through lines 36 and 35, respectively, into line 23. In any event a sufficient amount of liquid of desired density is passed to the activator 2 through the pipe 23 to maintain the desired level in the activator. Excess liquid from the tanks 33 and 28 pass through an overflow at the top of each of these tanks to discard or to suitable treators to recover the chemical values in these liquors.

The activated and washed clay together with some wash liquor are removed from the bottom of the wash tower through outlet 37 equipped with a suitable valve 38. One or more of such valved outlets may be used. The clay together with such wash water as unavoidably escapes with it drops into the hopper 39 and is then flushed through conduit 40 into a conventional dewatering device 41 which may be a rotating screen. The water removed from the clay in the dewatering device may be discarded or fed back into the wash tower through inlet 30.

The dewatered clay is then passed by a conveyer 42 to product drier 4, after which it may be passed by conveyer 43 to calciner 44 where it may be calcined in a rotary drier for from 20 minutes to one hour or more at 600–1000° F. but where it is preferably calcined for about 30 minutes at a temperature of about 850° F. After calcining the clay may be transferred by conveyer 45 to cooler 46. After cooling, the clay may be transferred through conveyer 47 to grinder 5, where it is ground to a size suitable for a decolorizing material or a cracking catalyst. From the roller grinder 5 the ground acid activated clay may be passed through conduit 48 into air separator 49 where the undesirably fine particles are removed, after which the finished product may be sent through conveyer 50 to storage silo 51 from which it may be shipped as needed. Where an oil decolorizing product is to be made the calcining and cooling steps in the calciner 44 and cooler 46, respectively, may be eliminated and the clay may be passed directly from drier 4 into grinder 5. Where, however, a fluid catalyst is to be made it is desirable to calcine the dry clay before grinding since the calcining step reduces the amount of undesirable fine particles produced during the grinding.

Instead of separating the acid activated clay and the mother liquor on screen 22 these materials may be dropped directly into wash tower 3. In such a procedure all of the mother liquor is diluted with the wash water and the overflow from the wash tower may be passed to tank 33 and such portion of it as desired may be used as the side stream by passing it through line 23. Any excess wash water may be passed to discard or treated to recover its chemical values. Likewise, instead of surmounting activator 2 or wash tower 3, these apparatus may be placed at the same or different levels.

An acid activated sub-bentonite product having a hydrated silica content of 19% was produced using a reaction time of three hours in the above-described process. A stream of pellets at 100° F. having a volatile matter content of 32% was introduced into the reactor together with a stream of a 60% solution of sulfuric acid at 190° F. The rate of introduction of the acid was such that 46 pounds of acid calculated as 100% acid were introduced into the reaction for each 100 pounds of pellets on a volatile-free basis. Volatile-free clay as used herein in this specification is clay that has been heated to constant weight at 1700° F. This amounted to about 77 pounds of 60% acid for each 146 pounds of pellets having 32% volatile matter. Under these conditions the concentration of the acid in the top of the reactor remained in the range 35–45%, the drop in concentration from the 60% concentration in the incoming stream of acid being caused by dilution due to the water content of the pellets and also due to consumption of the acid by the clay.

At this rate of introduction of the acid with respect to the pellets, there was insufficient acid to maintain a liquid level in the reactor above that of the pellets. One of the reasons for this is to be found in the interstitial space between the mass of clay. In order to discharge a flowable mixture from the activator, 65 pounds of liquid are entrained with each 35 pounds of volatile free clay product, whereas with each 35 pounds of volatile free pellets charged only 38 pounds of liquid is charged which comprises the 60 per cent concentration acid and the water in the pellets. Therefore, in order to maintain a constant level in the reactor the deficiency of 27 pounds of liquid per 35 pounds of introduced volatile free pellets must be made up by liquids introduced in the side stream. The stream of liquid introduced near the bottom of the reactor was not maintained as a practical matter at a constant rate but was introduced at such a rate as to maintain a constant level in the reactor. This was accomplished by conventional constant level mechanism which actuated the valve 24 in inlet duct 23. The stream introduced near the bottom of the reactor was taken from the accumulator tank 33 in which the wash liquor from the washing step was collected. The temperature of the stream at the inlet 23 was about 175° F.

The activated clay was passed from the reactor into the washing tower where it was washed countercurrently with water until its acid content was reduced to about 10 mg. of KOH per gram of clay. This value is determined by placing a known weight of dry clay in distilled water, boiling for three minutes, filtering and titrating the filtrate with standard KOH solution.

After washing the clay was dried, a portion of it was calcined at 850° F. for 30 minutes and ground in a roller mill. The remaining clay was ground after the drying step and the calcining and cooling steps were omitted. Only an 80% yield of satisfactory fluid catalyst was obtained from the uncalcined product. On the other hand, 100% of the calcined product was satisfactory as to particle size for a fluid cracking catalyst. The activated products also exhibited satisfactory bleaching efficiency and catalytic cracking activity.

While the invention has been described in connection with the use of pelleted clay, it is obvious that unpelleted clay particles which have been compacted or which are sufficiently strong may be used from which the very fine sizes have been removed by screening. For best results a pelleted clay is used, however, and the pellets are preferably $\frac{3}{16}$ inch in diameter and $\frac{3}{8}$ inch in length, although larger or smaller sizes may be used. Where unpelleted clay particles are used they are preferably of a size such that all the particles will pass through a 3-mesh screen and all of them retained on a 12-mesh screen, although larger and smaller sizes may also be used.

We claim:

1. A process for continuously acid activating clay comprising introducing adjacent the top of a single, unobstructed reaction zone a stream of clay pellets and a stream of concentrated acid solution in amounts sufficient to activate the clay but insufficient to maintain the level of the liquid in the reaction zone above the level of the pellets therein, withdrawing activated clay and liquid from the lower end of the reaction zone, the rate of clay withdrawal being equivalent to pellet addition to said zone, the rate of liquid withdrawal being greater than that of said stream of concentrated acid and introducing a side stream comprising a portion of said withdrawn liquid into the lower portion of the reaction zone in an amount sufficient to maintain the liquid level in the reaction zone above the level of the pellets therein without substantial mixing between said side stream and the acid above the point of introduction of the side stream.

2. A process for continuously acid activating clay comprising introducing adjacent the top of a single-unobstructed reaction zone a stream of clay pellets and a stream of concentrated acid solution in amounts sufficient to activate the clay but insufficient to maintain the level of the liquid in the reaction zone above the level of the pellets therein, withdrawing activated clay and liquid from the lower end of the reaction zone, the rate of clay withdrawal being equivalent to pellet addition to said zone, the rate of liquid withdrawal being greater than that of said stream of concentrated acid and introducing a side stream of liquid into the lower portion of the reaction zone, said side stream of liquid having an acid concentration no greater than the concentration of the acid at the point of introduction of the said side stream, introducing the side stream of liquid in amounts sufficient to maintain the liquid level in the reaction zone above the level of the pellets therein without substantial mixing between said side stream and the acid above the point of introduction of the side stream.

3. A process for continuously acid activating clay comprising introducing adjacent the top of a single, unobstructed reaction zone a stream of clay pellets and a stream of concentrated sulfuric acid solution in amounts sufficient to activate the clay with an initial concentration of acid of at least 25% but insufficient to maintain the level of the liquid in the reaction zone above the level of the pellets therein, withdrawing activated clay and liquid from the lower end of the reaction zone, the rate of clay withdrawal being equivalent to pellet addition to said zone, the rate of liquid withdrawal being greater than that of said stream of concentrated acid and introducing a side stream of liquid into the lower portion of the reaction zone, said side stream of liquid having an acid concentration no greater than the concentration of the acid at the point of introduction of the said side stream, introducing the side stream of liquid in amounts sufficient to maintain the liquid level in the reaction zone above the level of the pellets therein without substantial mixing between said side stream and the acid above the point of introduction of the side stream.

4. A process for continuously acid activating sub-bentonite clay comprising introducing adjacent the top of a single, unobstructed reaction zone a stream of clay pellets and a stream of concentrated sulfuric acid solution in amounts sufficient to activate the clay with an initial concentration of acid of 25%–45% but insufficient to maintain the level of the liquid in the reaction zone above the level of the pellets therein, introducing a side stream of liquid into the lower portion of the reaction zone, said side stream of liquid having an acid concentration no greater than the concentration of the acid at the point of introduction of the said side stream, introducing the side stream of liquid in amounts sufficient to maintain the liquid level in the reaction zone above that of the pellets therein without substantial mixing between said side stream and the acid above the point of introduction of the side stream, withdrawing activated clay and liquid from the lower end of the reaction zone, the rate of clay withdrawal being equivalent to the rate of pellet addition to said zone, the rate of liquid withdrawal being greater than that of said stream of concentrated acid and washing, drying, and grinding the pellets withdrawn from said reaction zone.

5. A process for continuously acid activating sub-bentonite clay comprising introducing adjacent the top of a single, unobstructed reaction zone a stream of clay pellets and a stream of concentrated sulfuric acid solution in amounts sufficient to activate the clay and with an initial concentration of acid of 25%-45% but insufficient to maintain the level of the liquid in the reaction zone above the level of the pellets therein, introducing a side stream of liquid into the lower portion of the reaction zone, said side stream of liquid having an acid concentration no greater than the concentration of the acid at the point of introduction of the said side stream, introducing the side stream of liquid in amounts sufficient to maintain the liquid level in the reaction zone above that of the pellets therein without substantial mixing between said side stream and the acid above the point of introduction of the side stream, withdrawing activated clay and liquid from the lower end of the reaction zone, the rate of clay withdrawal being equivalent to the rate of pellet addition to said zone, the rate of liquid withdrawal being greater than that of said stream of concentrated acid, and washing, drying, calcining, and grinding the pellets withdrawn from said reaction zone.

6. A process for continuously producing an acid activated sub-bentonite fluid cracking catalyst comprising introducing adjacent the top of a single, unobstructed reaction zone a stream of clay pellets and a stream of concentrated sulfuric acid solution in amounts sufficient to activate the clay and with an initial concentration of acid of 25-45% but insufficient to maintain the level of the liquid in the reaction zone above the level of the pellets therein, withdrawing activated clay and mother liquor from the bottom of the reaction zone, separating the activated clay from the mother liquor, introducing the thus separated clay into a washing zone, countercurrently washing the clay therein with an upward stream of water, introducing as a side stream adjacent the bottom of said reaction zone a portion of the wash water from said washing zone in amounts sufficient to maintain the liquid level in the reaction zone above that of the clay therein without substantial mixing between said side stream and the acid above the point of introduction of the side stream, withdrawing washed clay from the washing zone, drying, calcining and grinding the clay and recovering a fluid cracking catalyst from the grinding step.

LEE VAN HORN.
LEON ARTHUR KAHN.

REFERENCES CITED

The following references are of record in the file of this patent:

UNITED STATES PATENTS

| Number | Name | Date |
|---|---|---|
| 1,818,453 | Baylis | Sept. 11, 1931 |